(12) United States Patent
Kobayashi et al.

(10) Patent No.: US 9,684,208 B2
(45) Date of Patent: *Jun. 20, 2017

(54) LIQUID CRYSTAL DISPLAY APPARATUS

(71) Applicant: STANLEY ELECTRIC CO., LTD., Meguro-ku, Tokyo (JP)

(72) Inventors: Makoto Kobayashi, Tokyo (JP); Mitsuo Fujii, Tokyo (JP); Yasuhiro Nomura, Tokyo (JP); Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 14/281,604

(22) Filed: May 19, 2014

(65) Prior Publication Data

US 2014/0354929 A1 Dec. 4, 2014

(30) Foreign Application Priority Data

May 28, 2013 (JP) .................................. 2013-111780

(51) Int. Cl.
*G02F 1/1337* (2006.01)
*G02F 1/1343* (2006.01)
(Continued)

(52) U.S. Cl.
CPC .. *G02F 1/133753* (2013.01); *G02F 1/133784* (2013.01); *G02F 1/134336* (2013.01);
(Continued)

(58) Field of Classification Search
CPC ......... G02F 1/133753; G02F 2201/122; G02F 2001/134318; G02F 1/133707; G02F 1/134309
See application file for complete search history.

(56) References Cited

U.S. PATENT DOCUMENTS 8,659,731 B2    2/2014  Iwamoto et al.
9,411,195 B2 *  8/2016  Nomura ............ G02F 1/134309
(Continued)

FOREIGN PATENT DOCUMENTS

EP    2233969 A2    9/2010
JP    06-027907 A   2/1994
(Continued)

OTHER PUBLICATIONS

Extended European Search Report dated Nov. 4, 2014 issued in counterpart European Application No. 14169992.6.
(Continued)

*Primary Examiner* — Jessica M Merlin
(74) *Attorney, Agent, or Firm* — Holtz, Holtz & Volek PC (57) ABSTRACT

To improve the display quality of a vertical alignment liquid crystal display apparatus. The apparatus comprises two substrates, a first electrode extending in a first direction, a second electrode extending in a second direction intersecting the first direction, a crystal layer provided between the substrates, a pixel is configured where the two electrodes intersect, an electrode edge of the second electrode is of a shape that includes line segments obliquely crossed relative to the second direction and bend back, the pixel edges of the pixel are demarcated, including the line segments that are obliquely crossed, and the liquid crystal layer is disposed so that the angle of the alignment direction of the crystal molecules at the center and the direction perpendicular to the second direction is greater than 0°, and the alignment direction of the crystal molecules and the direction of obliquely crossed line segments don't become perpendicular.

16 Claims, 6 Drawing Sheets

(51) Int. Cl.
G02F 1/139 (2006.01)
G02F 1/137 (2006.01)

(52) U.S. Cl.
CPC .. *G02F 1/1393* (2013.01); *G02F 2001/13373* (2013.01); *G02F 2001/13712* (2013.01); *G02F 2001/133742* (2013.01); *G02F 2201/122* (2013.01)

(56) References Cited

U.S. PATENT DOCUMENTS

2012/0069278 A1   3/2012   Iwamoto
2012/0105786 A1*  5/2012   Iwamoto ............. G02F 1/13378
                                                        349/139

FOREIGN PATENT DOCUMENTS

| JP | 2005-244254 A | 9/2005 |
| JP | 2012-093578 A | 5/2012 |
| JP | 2012-098333 A | 5/2012 |
| WO | 2013114954 A1 | 8/2013 |

OTHER PUBLICATIONS

Japanese Office Action dated Feb. 1, 2017, issued in counterpart Japanese Application No. 2013-111780.

\* cited by examiner

LIQUID CRYSTAL DISPLAY APPARATUS

BACKGROUND OF THE INVENTION

Field of the Invention

The present invention relates to a vertical alignment liquid crystal display apparatus which is driven by multiplex driving.

Description of the Background Art

A liquid crystal display apparatus is broadly used as an information display unit in various electronic devices for consumer or automobile use. In General, a liquid crystal display apparatus is configured by disposing a liquid crystal layer made of a liquid crystal material between two substrates that are placed opposite each other with a gap of roughly several micrometers. As one type of this kind of liquid crystal display apparatus, a vertical alignment liquid crystal display apparatus is known.

In the vertical alignment liquid crystal display apparatus, multiplex driving is used, for example, in order to achieve a dot matrix display. When multiplex driving is conducted, even when the number of scanning lines (the number of common electrodes) is increased, in order to maintain the display quality, a steeper electro-optical characteristics is required. In this regard, for example, Japanese Patent Laid-Open No. 2005-244254 (Patent Document 1) discloses that in order to achieve a favorable steepness, setting the pretilt angle as close to 90° as possible is effective.

Meanwhile, in the foregoing vertical alignment liquid crystal display apparatus, there are cases where a decrease in display uniformity occurs mainly to pixels in a bright state. And this phenomenon is particularly notable in a high temperature environment. The present inventors studied this phenomenon and confirmed that this is caused by the irregular occurrence of unexpected dark regions around the center and not including the edges of the pixels in a bright state. Such dark regions is considered to occur due to the liquid crystal molecules included in the liquid crystal layer aligning to the different direction from the direction regulated by the alignment film.

The disadvantage described above may be eliminated by the liquid crystal display apparatus disclosed in Japanese Patent Laid-Open No. 2012-98333 (hereinafter referred to as Patent Document 2). Specifically, the liquid crystal display apparatus of this precedent is comprised of strip-shaped upper and lower electrodes wherein a pixel is configured in the region where the extending directions of the respective electrodes intersects, and the alignment direction of the liquid crystal layer is set so that the alignment direction of the liquid crystal molecules at the substantial center in the layer thickness direction of the liquid crystal layer does not become orthogonal to one of the edges of the upper/lower electrodes.

Moreover, the disadvantage described above may be eliminated by the liquid crystal display apparatus disclosed in Japanese Patent Laid-Open No. 2012-93578 (hereinafter referred to as Patent Document 3). Specifically, the liquid crystal display apparatus of this precedent is comprised of upper and lower electrodes wherein the edges of one electrode are formed into bending shapes and a pixel is configured in the region where the extending directions of the respective electrodes intersects, and further the alignment direction of the liquid crystal molecules at the substantial center in the layer thickness direction of the liquid crystal layer is set parallel to the other electrode. In other words, the alignment direction of the liquid crystal layer is set so that the alignment direction of the liquid crystal molecules at the substantial center in the layer thickness direction of the liquid crystal layer does not become orthogonal to one of the edges of the upper/lower electrodes.

However, according to the liquid crystal display apparatus disclosed in Patent Document 2, in a case where an (often employed) arrangement wherein one of the strip-shaped upper/lower electrodes is made to correspond to the up-down direction and the other is made to correspond to the left-right direction of the display surface of the liquid crystal display apparatus is adopted, the orientation direction of the liquid crystal molecules at the substantial center in the layer thickness direction of the liquid crystal layer needs to be set in a direction that deviates from the up-down direction of the display surface. While it is effective to eliminate a decrease in the display uniformity described above by further increasing the deviation of the orientation direction of the liquid crystal molecules at the substantial center in the layer thickness direction of the liquid crystal layer from the up-down direction of the display surface, asymmetry occurs in the visual angle dependencies during a bright display in the left-right direction of the liquid crystal display apparatus, making such increased deviation not preferred.

Further, according to the liquid crystal display apparatus disclosed in Patent Document 3, it is effective to eliminate a decrease in the display uniformity described above by further increasing the angle formed by the edge of one of the upper/lower electrodes and the orientation direction of the liquid crystal molecules at the substantial center in the layer thickness direction of the liquid crystal layer, but to do so requires further increase of the angle at which the edge of the electrode bends.

Increasing the angle at which the edge bends, however, makes the shape of the bent edge noticeably discernable in appearance, and therefore is not preferred.

SUMMARY OF THE INVENTION

An object of a specific mode of the present invention which relates to a vertical alignment liquid crystal display apparatus driven by multiplex driving, is to improve the display quality.

The liquid crystal display apparatus according to a specific mode of the present invention comprises (a) a first substrate and a second substrate placed opposite each other, (b) a first electrode provided on one surface of the first substrate and which extends in a first direction, (c) a second electrode provided on one surface of the second substrate and which extends in a second direction intersecting the first direction, and (d) a mono-domain vertical alignment type liquid crystal layer with a pretilt angle of less than 90°, provided between one surface of the first substrate and one surface of the second substrate, (e) wherein a pixel is configured in a region where the first electrode and the second electrode intersect, (f) in a planer view, an electrode edge of at least one side of the second electrode is of a shape that includes line segments that are obliquely crossed relative to the second direction and bend back, (g) the pixel edges of the pixel are demarcated, including the line segments that are obliquely crossed, and (h) in a planer view, the liquid crystal layer is disposed so that the angle of the alignment direction of the liquid crystal molecules at the substantial center in the layer thickness direction and the direction perpendicular to the second direction is set to be greater than 0°, and the alignment direction of the liquid crystal molecules and the direction of line segments that are obliquely crossed do not become perpendicular. The expression "vertical alignment" here refers to an alignment comprising a pretilt angle of a size less than 90° but yet considerably large (greater than or equal to 87° and less than 90°, for example). The expression "obliquely crossed" here refers to the oblique crossing at an angle other than perpendicular.

According to the foregoing configuration, even if the angle at which the second electrode 12 bends is not very large, it is possible to increase the angle formed by either the left or right edge of the pixel and the orientation direction of the liquid crystal molecules at the substantial center in the layer thickness direction of the liquid crystal layer. As a result, especially in a high temperature environment, a decrease in display uniformity caused by the irregular occurrence of unexpected dark regions around the center and not including the edges of the pixels can be suppressed.

In the liquid crystal display apparatus described above, it is also preferred that the change points where the directions of a plurality of line segments of the electrode edge of the second electrode change are disposed overlapping in the planar view with the first electrode.

The change point of the electrode edge of the second electrode (for example, the bending point where the lines connect) is set to a position that is superimposed with the first electrode, thereby eliminating the need for high accuracy in the alignment of the first substrate and the second substrate and making it possible to improve the yield as well as production efficiency.

In the above described liquid crystal display apparatus, the change point is preferably disposed at the center between the electrode edges of both sides of the first electrode, for example. The term "center" here refers to an intermediate point between the first element and the second element, permitting a range of ±5% with respect to the intermediate point taking into consideration the manufacturing tolerance.

As a result, a pixel edge of a horizontally or vertically symmetrical shape is obtained.

In the above described liquid crystal display apparatus, the change point is preferably disposed so that it is biased toward the side near the electrode edge of either one side of the first electrode, for example.

As a result, the margin of the alignment of the first substrate and the second substrate is further increased. Further, an effect of further homogenizing the orientation state of the liquid crystal layer is achieved.

In the above described liquid crystal display apparatus, the line segments that are obliquely crossed are preferably disposed at an angle greater than 0° and less than or equal to 15° using the second direction as standard.

As a result, it is possible to visually recognize the shape of the pixel edge as close to that of a rectangle.

DESCRIPTION OF THE PREFERRED EMBODIMENTS

Figure 1:
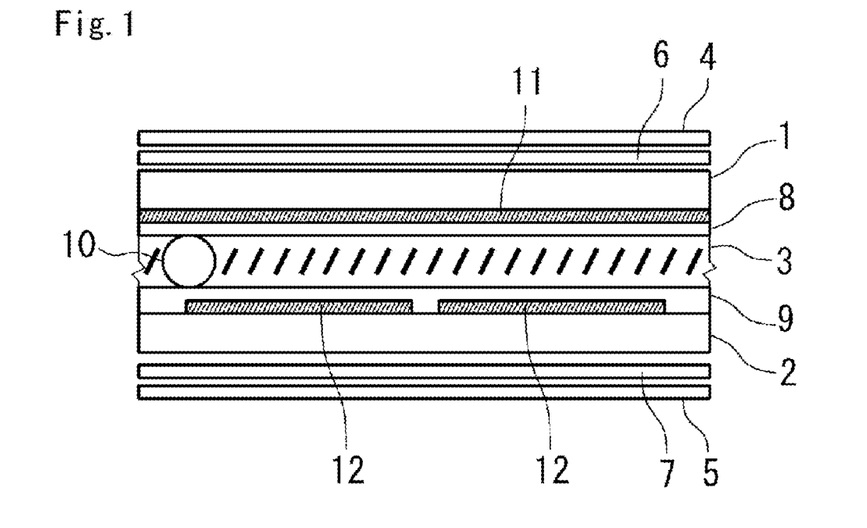
FIG. 1 is a schematic cross section showing the structure of the liquid crystal display apparatus according to one embodiment of the present invention.

FIG. 1 is a schematic cross section showing the structure of the liquid crystal display apparatus according to one embodiment of the present invention. The liquid crystal display apparatus of this embodiment shown in FIG. 1 mainly comprises a first substrate 1 and a second substrate 2 placed opposite each other and a liquid crystal layer 3 provided between both substrates. A first polarizer 4 is disposed outside the first substrate 1, and a second polarizer 5 is disposed outside the second substrate 2. A first viewing angle compensator 6 is disposed between the first substrate 1 and the first polarizer 4, and a second viewing angle compensator 7 is disposed between the second substrate 2 and the second polarizer 5. The periphery of the liquid crystal layer 3 is sealed with a sealant. The structure of the liquid crystal display apparatus is now explained in further detail.

The first substrate 1 and the second substrate 2 are respectively, for example, transparent substrates such as glass substrates or plastic substrates. Spacers 10 are dispersed and disposed between the first substrate 1 and the second substrate 2. As a result of these spacers 10, the gap between the first substrate 1 and the second substrate 2 is maintained at a predetermined distance (in this embodiment, a few micrometers).

The liquid crystal layer 3 is provided mutually between the first electrode 11 of the first substrate 1 and the second electrode 12 of the second substrate 2. In this embodiment, the liquid crystal layer 3 is configured by using a liquid crystal material (nematic liquid crystal material) in which the dielectric anisotropy $\Delta \in$ (delta epsilon) is negative ($\Delta \in <0$). Bold lines illustrated in the liquid crystal layer 3 schematically show the director of the liquid crystal molecules during the non-application of voltage. As shown in the diagram, with the liquid crystal display apparatus of this embodiment, the alignment state of the liquid crystal molecules in the liquid crystal layer 3 is oriented by a monodomain alignment. The pretilt angle of the liquid crystal layer 3 in this embodiment is preferably set close to 90° but smaller than 90°, for example, 89.85°. And the refractive index anisotropy $\Delta n$ (delta n) of the liquid crystal layer 3 is set to 0.18, for example.

The polarizer 4 and the polarizer 5 are disposed so that their respective absorption axes are mutually perpendicular (crossed Nicol alignment). Moreover, the polarizer 4 and the polarizer 5 are disposed so that their respective absorption axes form an angle of substantially 45° with both the direction 14 of the alignment treatment performed to the first substrate and the direction 13 of the alignment treatment performed to the second substrate. Consequently, the absorption axes of the respective polarizers 4, 5 form an angle of substantially 45° relative to the alignment direction of the liquid crystal layer at the substantial center of the liquid crystal layer 3 that is defined by the directions 13, 14 of the respective alignment treatments.

An alignment film 8 is provided to one surface side of the first substrate 1 so as to cover the first electrode 11. Similarly, an alignment film 9 is provided to one surface side of the second substrate 2 so as to cover the second electrode 12. Alignment treatment such as rubbing treatment is performed on the surface of the respective alignment films 8,9. In this embodiment, as the alignment film 8 and the alignment film 9, used is a film (vertical alignment film) for controlling the alignment state of the liquid crystal layer 3 in its initial state (during non-application of voltage) to a vertically aligned state. More specifically, as the respective alignment films 8, 9, used is a film that is capable of forming a pretilt angle that is extremely close to 90° but smaller than 90° relative to the liquid crystal molecules of the liquid crystal layer 3.

The first electrode 11 is provided to one surface side of the first substrate 1. Similarly, the second electrode 12 is provided to one surface side of the second substrate 2. In this embodiment, a plurality of first electrodes 11 and a plurality of second electrodes 12 respectively extending in specific directions are placed opposite each other by causing their respective extending directions to intersect (crisscross). The first electrode 11 and the second electrode 12 is configured respectively, for example, by patterning a transparent conductive film made of indium tin oxide (ITO) or the like as needed. With the liquid crystal display apparatus of this embodiment, the respective overlapping portions of the first electrode 11 and the second electrode 12 in a planar view become the pixel.

In this embodiment, by causing the electrode edge of the respective second electrodes 12 to be a polygonal line shape (a shape with repeated inflection) including a line segment which obliquely crosses the extending direction (first direction) of each of the stripe-shaped first electrode, and by shifting the directions of the respective alignment treatment to a predetermined angle relative to the first direction, a structure is achieved where the pixel edge of the portion that is demarcated by the electrode edge of the respective second electrodes 12 among the respective pixels and the directions 13, 14 of the respective alignment treatment are not perpendicular. Some specific structures are described below.

Figure 2:
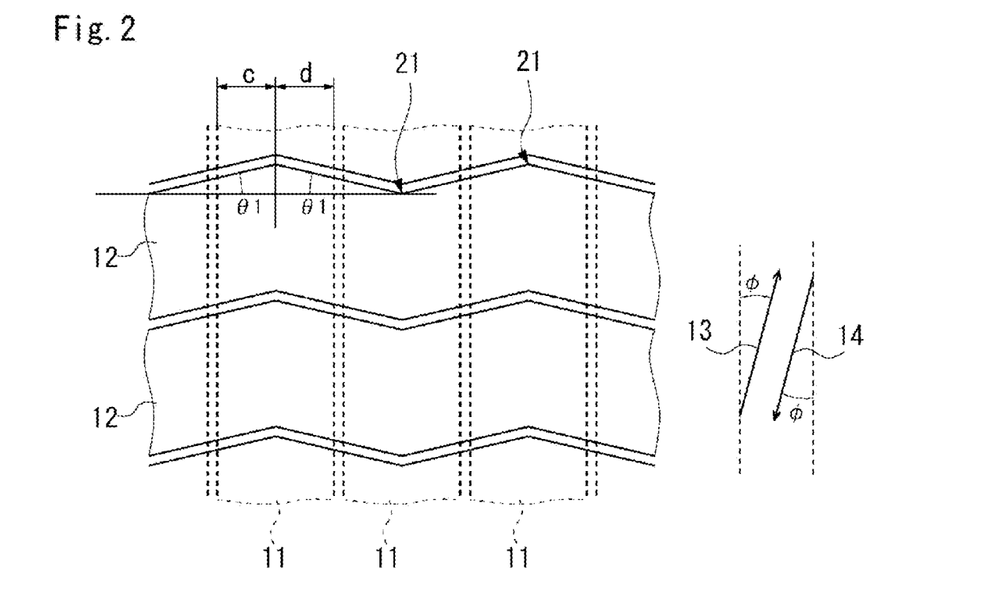
FIG. 2 is a schematic plan view showing an example of the electrode structure.

FIG. 2 is a schematic plan view showing an example of the electrode structure. FIG. 2 shows a planer view of the first electrodes 11 and the second electrodes 12 viewed from the second substrate 2 side (the same applies for FIGS. 3-8, and FIGS. 11-12). As shown in FIG. 2, the electrode edge of the respective second electrodes 12 extending in the longitudinal direction in the diagram is formed in a saw teeth shape, and one pitch of the saw teeth basically coincides with the electrode width of the respective first electrodes 11. Also, as shown in FIG. 2, the respective second electrodes 12 are disposed in a state in which the bending points (apex angle portions) 21, which are the change points where the lines interconnect, overlap with one of the center portion in the width direction of the first electrode 11. In this example, the respective bending points 21 of the one electrode edge and the other electrode edge of the respective second electrodes 12 are in positions that result in the bending points 21 that overlap with the one first electrode 11 being substantially in alignment in the up-down direction in the diagram, and the bending points 21 in these aligned positions are disposed upwardly convex or downwardly concave in alignment.

Since each of the regions where the respective first electrodes 11 and the respective second electrodes 12 intersect constitutes one pixel, the outer edge shape (planar view shape) of the respective pixels forms a hexagon with a V shape or inverted V shape demarcated by an electrode edge of the first electrode 11 and an electrode edge of the second electrode 12, each surface area thereof being substantially equal. Specifically, a V-shaped pixel and an inverted V-shaped pixel are alternately arranged in the left-right direction, and a V-shaped or inverted V-shaped pixel is sequentially arranged in the up-down direction.

In FIG. 2, when the angle formed by the electrode edge of the second electrode 12 and the horizontal direction (longitudinal direction in the diagram) is defined as θ1, this angle θ1 is set to be greater than 0°. Further, this angle θ1 is preferably set to 15° or less. The reason for this is that, under such conditions, the bent state of the pixel edge is not readily visually discernable and thus an outer appearance that is not inferior to that of a rectangular-shaped pixel is achieved (hereinafter the same). Further, in FIG. 2, given φ as the angle formed by directions 13, 14 of the respective orientation processes with respect to a first direction (up-down direction in the figure), which is the extending direction of the first electrode 11, this angle φ is set so that it is greater than 0° and greater than angle θ1. This angle φ is preferably set to 15° or less and more preferably to 10° or less as a condition of ensuring that, in appearance, a sense of incongruity due to the asymmetry of the visual angle dependencies during a bright display in the left-right direction is not substantially generated. Note that the orientation direction of the liquid crystal molecules at the substantial center in the layer thickness direction of the liquid crystal layer 3 is parallel to the directions 13, 14 of the respective orientation processes.

With this arrangement, a structure wherein the pixel edges of the sections demarcated by the electrode edges of the respective second electrodes 12 of the respective pixels and the direction of the liquid crystal molecules at the substantial center in the layer thickness direction of the liquid crystal layer 3 do not orthogonally intersect is achieved. More specifically, the angle formed by the left-side edge of the pixel edges shown in FIG. 2 and the orientation direction of the liquid crystal molecules at the substantial center in the layer thickness direction of the liquid crystal layer is θ1+φ, and the angle formed by the right-side edge and the orientation direction of the liquid crystal molecules at the substantial center in the layer thickness direction of the liquid crystal layer is θ1−φ. Hence, the respective absolute values of θ1+φ and θ1−φ need to be greater than 0°, and are preferably 5° or greater (hereinafter the same). With this arrangement, even if angle θ1, which is the angle at which the second electrode 12 bends, is not very large, it is possible to increase the angle formed by either the left or right edge of the pixel and the orientation direction of the liquid crystal molecules at the substantial center in the layer thickness direction of the liquid crystal layer. As a result, especially in a high temperature environment, a decrease in display uniformity caused by the irregular occurrence of unexpected dark regions around the center and not including the edges of the pixels can be suppressed.

Further, all of the bending points 21 of the respective second electrodes 12 are disposed overlapping with the center portion (the center between the electrode edges of both sides of the first electrode) in the width direction of the first electrode 11, thereby never resulting in the occurrence of extreme deformation in the pixel shape, even if some displacement occurs when the first substrate 1 and the second substrate 2 are superimposed, and thus achieving a stable display state with favorable yield (hereinafter the same).

Figure 3:
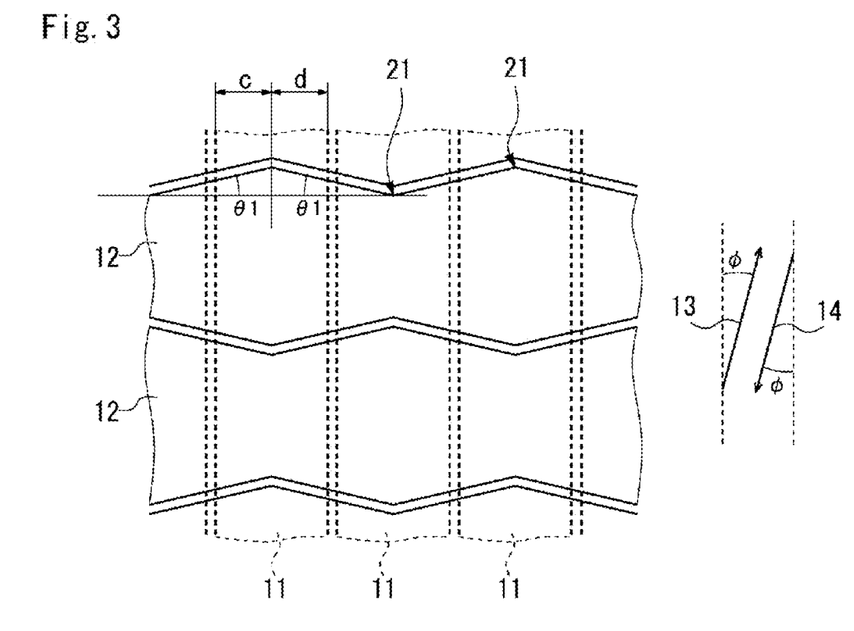
FIG. 3 is a schematic plan view showing another example of the electrode structure.

FIG. 3 is a schematic plan view showing another example of the electrode structure. As shown in FIG. 3, the electrode edge of the respective second electrodes 12 extending in the longitudinal direction in the diagram is formed in a saw teeth shape, and one pitch of the saw teeth basically coincides with the electrode width of the respective first electrodes 11. Also, as shown in FIG. 3, the respective second electrodes 12 are disposed in a state in which the bending points (apex angle portions) 21, which are the change points where the lines interconnect, overlap with the center portion in the width direction of the first electrode 11. In this example, the respective bending points 21 of the one electrode edge and the other electrode edge of the respective second electrodes 12 are in positions that result in the bending points 21 that overlap with the one first electrode 11 being substantially in alignment in the up-down direction in the diagram. The bending points 21 in these aligned positions are disposed so as to form either a combination wherein one is upwardly convex while the other is downwardly convex (a combination where the distance between the bending points 21 is relatively large), or a combination wherein one is downwardly convex while the other is upwardly convex (a combination where the distance between the bending points 21 is relatively small).

Since each of the regions where the respective first electrodes 11 and the respective second electrodes 12 intersect constitutes one pixel, the outer edge shape (planar view shape) of the respective pixels is demarcated by an electrode edge of the first electrode 11 and an electrode edge of the second electrode 12. And the shape of the pixel is a hexagon, the surface area of which differs for two pixels adjacent in the up-down direction or left-right direction.

In FIG. 3, when the angle formed by the electrode edge of the second electrode 12 and the horizontal direction (longitudinal direction in the diagram) is defined as $\theta 1$, this angle $\theta 1$ is set to be from greater than 0° to 15° or below. Further, in FIG. 3, angle $\phi$ formed by directions 13, 14 of the respective orientation processes with respect to a first direction (up-down direction in the figure), which is the extending direction of the first electrode 11, is set so that it is greater than 0° and greater than angle $\theta 1$. Angle $\phi$ can be set to 10°, for example.

With this arrangement, a structure wherein the pixel edges of the sections demarcated by the electrode edges of the respective second electrodes 12 of the respective pixels and the direction of the liquid crystal molecules at the substantial center in the layer thickness direction of the liquid crystal layer 3 do not orthogonally intersect is achieved. Further, all of the bending points 21 of the respective second electrodes 12 are disposed overlapping with the center portion (the center between the electrode edges of both sides of the first electrode) in the width direction of the first electrode 11, thereby never resulting in the occurrence of extreme deformation in the pixel shape, even if some displacement occurs when the first substrate 1 and the second substrate 2 are superimposed, and thus achieving a stable display state with favorable yield. Note that, in comparison to the pixel structure shown in FIG. 2, the pixel structure shown in FIG. 3 produces a difference in surface area of the respective pixels, and thus the pixel structure shown in FIG. 2 is preferred. However, in a case where the pixel size is relatively small, the difference in surface area of the adjacent pixels decreases, resulting in no objection to such a pixel structure in terms of practical use.

Figure 4:
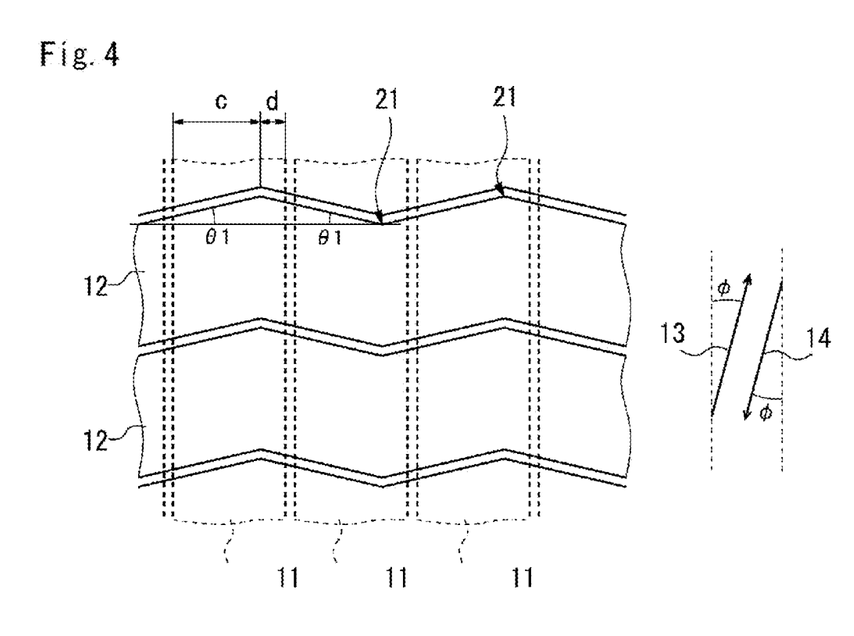
FIG. 4 is a schematic plan view showing another example of the electrode structure.

FIG. 4 is a schematic plan view showing another example of the electrode structure. As shown in FIG. 4, the electrode edge of the respective second electrodes 12 extending in the longitudinal direction in the diagram is formed in a saw teeth shape, and one pitch of the saw teeth basically coincides with the electrode width of the respective first electrodes 11. Further, as shown in FIG. 4, the respective second electrodes 12 are disposed with the bending point (apex angle portion) 21, which is the change point where the lines interconnect, overlapping with the first electrode 11 at a position biased toward the side near the left or right electrode edge (the electrode edge on the right side in the example shown) from the center portion in the width direction of the first electrode 11. In this example, the respective bending points 21 of the one electrode edge and the other electrode edge of the respective second electrodes 12 are in positions that result in the bending points 21 that overlap with the one first electrode 11 being substantially in alignment in the up-down direction in the diagram. Further, the bending points 21 in these aligned positions are disposed so as to form either a combination in which both are upwardly convex or a combination in which both are downwardly convex.

Since each of the regions where the respective first electrodes 11 and the respective second electrodes 12 intersect constitutes one pixel, the outer edge shape (planar view shape) of the respective pixels is demarcated by an electrode edge of the first electrode 11 and an electrode edge of the second electrode 12. And the shape of the pixel is a hexagon, the surface area of which coincides between the two pixels adjacent in the up-down direction or left-right direction. Further, the pixels adjacent in the up-down direction are of the same shape, and the pixels adjacent in the left-right direction are of the same shape while differing in orientation.

Also, in FIG. 4, when the angle formed by the electrode edge of the second electrode 12 and the horizontal direction (longitudinal direction in the diagram) is defined as $\theta 1$, this angle $\theta 1$ is set to be from greater than 0° to 15° or below. Further, in FIG. 4, angle $\phi$ formed by directions 13, 14 of the respective orientation processes with respect to a first direction (up-down direction in the figure), which is the extending direction of the first electrode 11, is set so that it is greater than 0° and greater than angle $\theta 1$. Angle $\phi$ can be set to 10°, for example. With this arrangement, a structure wherein the pixel edges of the sections demarcated by the electrode edges of the respective second electrodes 12 of the respective pixels and the direction of the liquid crystal molecules at the substantial center in the layer thickness direction of the liquid crystal layer 3 do not orthogonally intersect is achieved.

Further, all of the bending points 21 of the respective second electrodes 12 are disposed overlapping while offset to the left or right from the center portion in the width direction of the first electrode 11, thereby making it possible to further homogenize the orientation state of the liquid crystal layer compared to the electrode structures shown in FIG. 2 and FIG. 3 described above, that is, compared to a case where the respective bending points 21 are disposed overlapping at the center portion. Specifically, with regard to the electrode edges of the respective pixels, given length components c, d parallel to the left-right direction as shown in the diagram, the total length of c and d and the electrode widths of the respective first electrodes 11 are set substantially equal. At this time, the respective bending portions 21 are disposed on the right side as viewed from the center of the pixels in the diagram in a case where the relationship is set to c>d, and on the left side as viewed from the center of the pixels in the diagram in a case where the relationship is set to c<d. For example, in a case where the relationship is set to c>d, c is preferably set within the range of 1.5-5, that is, c:d is preferably set to 1.5-5:1 when d is set to 1 (in the case of c<d, the relationship becomes the reverse).

Figure 5:
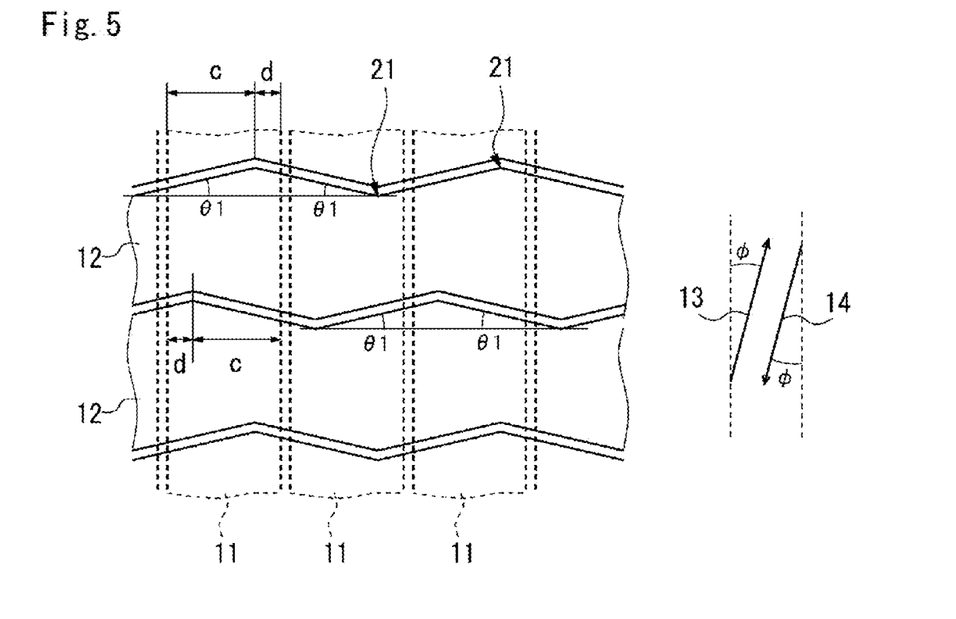
FIG. 5 is a schematic plan view showing another example of the electrode structure.

FIG. 5 is a schematic plan view showing another example of the electrode structure. As shown in FIG. 5, the electrode edge of the respective second electrodes 12 extending in the longitudinal direction in the diagram is formed in a saw teeth shape, and one pitch of the saw teeth basically coincides with the electrode width of the respective first electrodes 11. Further, as shown in FIG. 5, the respective second electrodes 12 are disposed with the bending point (apex angle portion) 21, which is the change point where the lines interconnect, overlapping with the first electrode 11 at a position biased toward the side near the left or right electrode edge from the center portion in the width direction of the first electrode 11. In this example, with regard to the respective bending points 21 of one electrode edge and the other electrode edge of the respective second electrodes 12, the respective bending points 21 that overlap with the one first electrode 11 are in different positions in the up-down direction in the diagram. Further, the bending points 21 in these different positions are disposed so as to form either a combination in which both are upwardly convex or a combination in which both are downwardly convex.

Since each of the regions where the respective first electrodes 11 and the respective second electrodes 12 intersect constitutes one pixel, the outer edge shape (planar view shape) of the respective pixels is demarcated by an electrode edge of the first electrode 11 and an electrode edge of the second electrode 12. And the shape of the pixel is a hexagon, the surface area of which coincides between the two pixels adjacent in the up-down direction or left-right direction. Further, the pixels adjacent in the up-down direction and the pixels adjacent in the left-right direction are of the same shape while differing in orientation. Then, every other pixel arranged in the up-down direction is of the same shape, and every other pixel arranged in the left-right direction is of the same shape.

Also, in FIG. 5, when the angle formed by the electrode edge of the second electrode 12 and the horizontal direction (longitudinal direction in the diagram) is defined as $\theta 1$, this angle $\theta 1$ is set to be from greater than 0° to 15° or below. Further, in FIG. 5, angle $\phi$ formed by directions 13, 14 of the respective orientation processes with respect to a first direction (up-down direction in the figure), which is the extending direction of the first electrode 11, is set so that it is greater than 0° and greater than angle $\theta 1$. Angle $\phi$ can be set to 10°, for example. With this arrangement, a structure wherein the pixel edges of the sections demarcated by the electrode edges of the respective second electrodes 12 of the respective pixels and the direction of the liquid crystal molecules at the substantial center in the layer thickness direction of the liquid crystal layer 3 do not orthogonally intersect is achieved.

Further, all of the bending points 21 of the respective second electrodes 12 are disposed overlapping while offset to the left or right from the center portion in the width direction of the first electrode 11, thereby making it possible to further homogenize the orientation state of the liquid crystal layer compared to the electrode structures shown in FIG. 2 and FIG. 3 described above, that is, compared to a case where the respective bending points 21 are disposed overlapping at the center portion. Specifically, with regard to the electrode edges of the respective pixels, given length components c, d parallel to the left-right direction as shown in the diagram, the total length of c and d and the electrode widths of the respective first electrodes 11 are set substantially equal. At this time, the respective bending portions 21 are disposed on the right side as viewed from the center of the pixels in the diagram in a case where the relationship at the electrode edge on the upper side in the diagram is set to c>d, and on the left side as viewed from the center of the pixels in the diagram in a case where the relationship at the electrode edge on the lower side in the diagram is set to c>d. In this example as well, c is preferably set within the range of 1.5-5, that is, c:d is preferably set to 1.5-5:1 when d is set to 1. At this time, while the ratio of c to d at the electrode edge on the upper side in the diagram does not necessarily have to equal the ratio of c to d at the electrode edge on the lower side in the diagram in the respective pixels, making the ratios equal makes the planar view shape of the respective pixels seemingly closer to that of a rectangle and is thus preferred.

Figure 6:
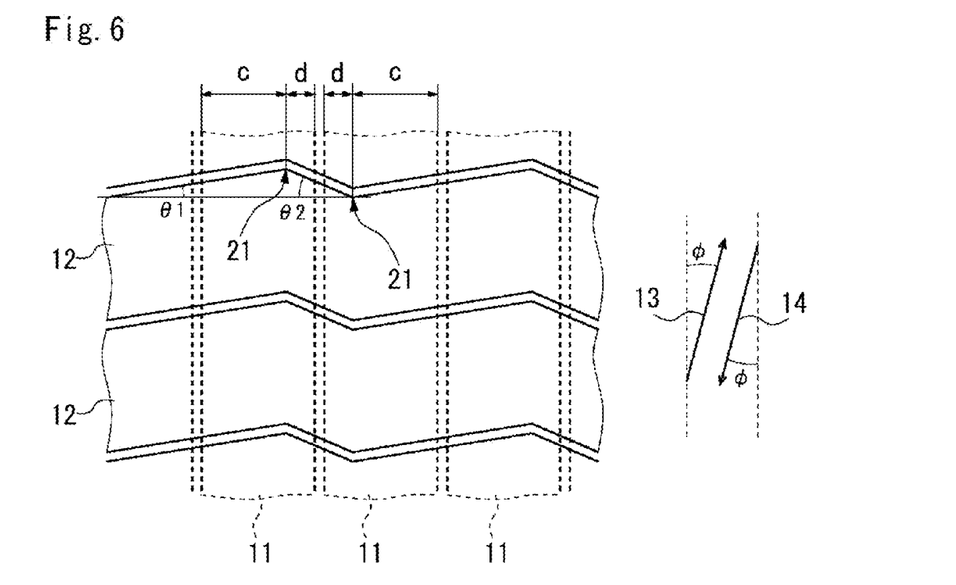
FIG. 6 is a schematic plan view showing another example of the electrode structure.

FIG. 6 is a schematic plan view showing another example of the electrode structure. As shown in FIG. 6, the electrode edge of the respective second electrodes 12 extending in the longitudinal direction in the diagram is formed in a saw teeth shape, and one pitch of the saw teeth basically coincides with the electrode width of the respective first electrodes 11. Further, as shown in FIG. 6, the respective second electrodes 12 are disposed with the bending point (apex angle portion) 21, which is the change point where the lines interconnect, overlapping with the first electrode 11 at a position biased toward the side near the left or right electrode edge from the center portion in the width direction of the first electrode 11. In this example, the respective bending points 21 of the one electrode edge and the other electrode edge of the respective second electrodes 12 are in positions that result in the bending points 21 that overlap with the one first electrode 11 being substantially in alignment in the up-down direction in the diagram. Further, the bending points 21 in these aligned positions are disposed so as to form either a combination in which both are upwardly convex or a combination in which both are downwardly convex.

Since each of the regions where the respective first electrodes 11 and the respective second electrodes 12 intersect constitutes one pixel, the outer edge shape (planar view shape) of the respective pixels is demarcated by an electrode edge of the first electrode 11 and an electrode edge of the second electrode 12. And the shape of the pixel is a hexagon, the shape of which coincides between the two pixels adjacent in the up-down direction. Further, the pixels adjacent in the left-right direction are of the same shape and surface area while differing in orientation. Then, every other pixel arranged in the left-right direction is of the same shape.

In FIG. 6, when the angles formed by the electrode edge of the second electrode 12 with respect to the horizontal direction (the left-right direction in the diagram) are respectively defined as $\theta 1$, $\theta 2$, the relationship is $\theta 1 < \theta 2$ and angle $\theta 1$ is set to a value greater than 0° and less than or equal to 15°. Further, in FIG. 6, angle $\phi$ formed by directions 13, 14 of the respective orientation processes with respect to a first direction (up-down direction in the figure), which is the extending direction of the first electrode 11, is set so that it is greater than 0° and greater than both angle $\theta 1$ and angle $\theta 2$. Angle $\phi$ can be set to 10°, for example. With this arrangement, a structure wherein the pixel edges of the sections demarcated by the electrode edges of the respective second electrodes 12 of the respective pixels and the direction of the liquid crystal molecules at the substantial center in the layer thickness direction of the liquid crystal layer 3 do not orthogonally intersect is achieved.

Further, all of the bending points 21 of the respective second electrodes 12 are disposed overlapping while offset to the left or right from the center portion in the width direction of the first electrode 11, thereby making it possible to further homogenize the orientation state of the liquid crystal layer compared to the electrode structures shown in FIG. 2 and FIG. 3 described above, that is, compared to a case where the respective bending points 21 are disposed overlapping at the center portion. Specifically, with regard to the electrode edges of the respective pixels, given length components c, d (c>d in this example) parallel to the left-right direction as shown in the diagram, the total length of c and d and the electrode widths of the respective first electrodes 11 are set substantially equal. In this example, c is preferably set within the range of 1.5-5, that is, c:d is preferably set to 1.5-5:1 when d is set to 1.

Figure 7:
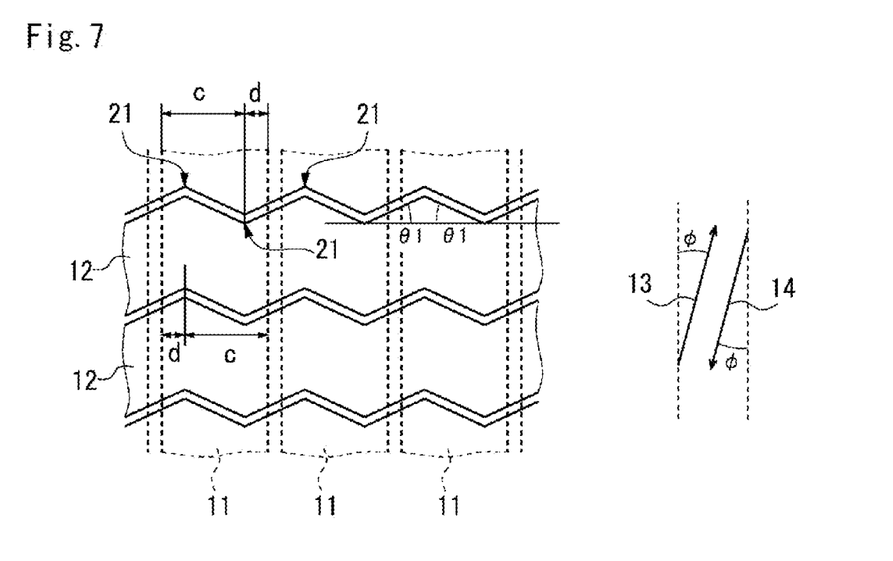
FIG. 7 is a schematic plan view showing another example of the electrode structure.

FIG. 7 is a schematic plan view showing another example of the electrode structure. As shown in FIG. 7, the electrode edge of the respective second electrodes 12 extending in the longitudinal direction in the diagram is formed in a saw teeth shape, and two pitches of the saw teeth basically coincides with the electrode width of the respective first electrodes 11. As shown in FIG. 7, the respective second electrodes 12 are disposed with the bending points (apex angle portions) 21, which are the change points where the lines interconnect, overlapping with the first electrode 11; specifically, the respective second electrodes 12 are disposed with two of the bending points 21 of the upper side electrode edge and two of the bending points 21 of the lower side electrode edges overlapping with the respective first electrodes 11. In this example, the respective bending points 21 of the one electrode edge and the other electrode edge of the respective second electrodes 12 are in positions that result in the bending points 21 that overlap with the one first electrode 11 being substantially in alignment in the up-down direction in the diagram. Further, the bending points 21 in these aligned positions are disposed comprising a combination in which both are upwardly convex (left side of pixel) and a combination in which both are downwardly convex (right side of pixel).

Since each of the regions where the respective first electrodes 11 and the respective second electrodes 12 intersect constitutes one pixel, the outer edge shape (planar view shape) of the respective pixels is demarcated by an electrode edge of the first electrode 11 and an electrode edge of the second electrode 12. And the shape of the pixel is a hexagon, the shape and the surface area of which coincides between the two pixels adjacent in the up-down direction and left-right direction.

Also, in FIG. 7, when the angle formed by the electrode edge of the second electrode 12 and the horizontal direction (longitudinal direction in the diagram) is defined as θ1, this angle θ1 is set to be from greater than 0° to 15° or below. Further, in FIG. 7, angle φ formed by directions 13, 14 of the respective orientation processes with respect to a first direction (up-down direction in the figure), which is the extending direction of the first electrode 11, is set so that it is greater than 0° and greater than angle θ1. Angle φ can be set to 10°, for example. With this arrangement, a structure wherein the pixel edges of the sections demarcated by the electrode edges of the respective second electrodes 12 of the respective pixels and the direction of the liquid crystal molecules at the substantial center in the layer thickness direction of the liquid crystal layer 3 do not orthogonally intersect is achieved.

Further, all of the bending points 21 of the respective second electrodes 12 are disposed overlapping while offset to the left or right from the center portion in the width direction of the first electrode 11, thereby making it possible to further homogenize the orientation state of the liquid crystal layer compared to the electrode structures shown in FIG. 2 and FIG. 3 described above, that is, compared to a case where the respective bending points 21 are disposed overlapping at the center portion. At this time, while the ratio of c to d at the electrode edge on the upper side in the diagram does not necessarily have to equal the ratio of c to d at the electrode edge on the lower side in the diagram in the respective pixels, making the ratios equal makes the planar view shape of the respective pixels seemingly closer to that of a rectangle and is thus preferred.

Figure 8:
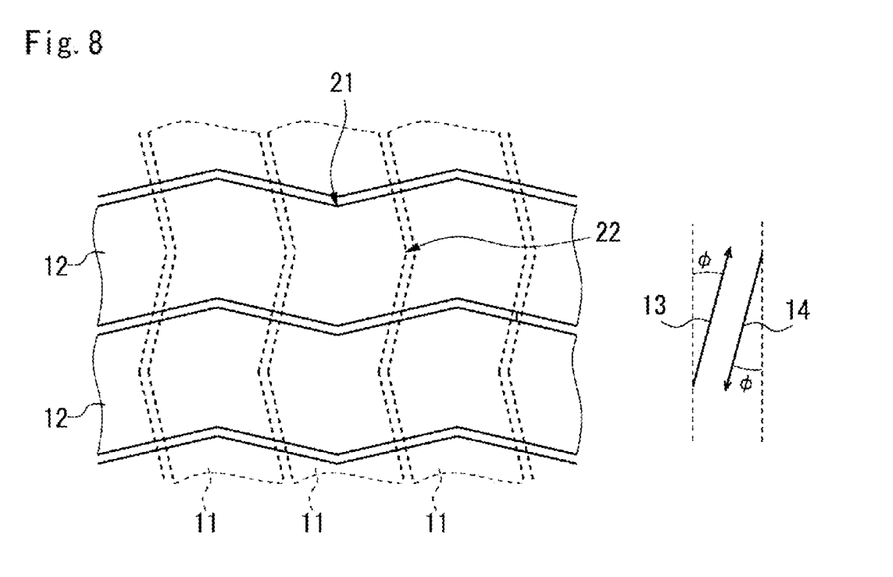
FIG. 8 is a schematic plan view showing an example of a modified electrode structure.

Note that while the electrode edge of only the second electrode 12 is bent in each of the embodiments described above, the electrode edge of the first electrode 11 may be bent as well. FIG. 8 is a diagram showing a schematic plan view that shows an example of an electrode structure in this case. As shown in FIG. 8, the electrode edges of the respective second electrodes 12 extending in the left-right direction in the diagram are formed in a saw tooth shape, and furthermore the electrode edges of the respective first electrodes 11 extending in the up-down direction in the diagram are also formed in a saw tooth shape. Also, as shown in FIG. 8, the respective second electrodes 12 are disposed in a state in which the bending points (apex angle portions) 21, which are the change points where the lines interconnect, overlap with the center portion in the width direction of the first electrode 11. Similarly, the respective first electrodes 11 are disposed in a state in which the bending points (apex angle portions) 22, which are the change points where the lines interconnect, overlap with the center portion in the width direction of the second electrode 12. Note that the arrangement of the respective bending points 21, 22 is not limited thereto, and various types such as those shown in FIGS. 3-7 described above can be considered.

(Execution Examples)

A segment electrode substrate and a common electrode substrate were fabricated by preparing a glass substrate on which an ITO film was formed after polishing one surface thereof and applying an $SiO_2$ undercoat to that surface, and forming the ITO film into a preferred electrode pattern on the glass substrate by a photolithography process and an etching process. Note that an insulating layer made of $SiO_2$ or the like may also be formed on a part of the surface of the electrode as needed.

The segment electrode substrate and the common electrode substrate were then washed with an alkaline solution, purified water, or the like, a vertical alignment film was subsequently applied to the respective substrates using the flexographic printing method, and the substrates were heated in a clean oven for 90 minutes at 200° C. Subsequently, a cotton rubbing cloth was used to perform the rubbing process on the both substrates in one direction within the substrate surface. Note that the rubbing process may also be performed on either one of the substrates only.

A thermo-curing type sealing material mixed with glass spacers of an approximate 5-μm rod-shape was applied to the common electrode substrate in a frame-like shape using a screen-printing method. Further, plastic spacers approximately 4.9 μm in size were sprayed and disposed in the segment electrode substrate using a dry-spraying method. Subsequently, both substrates were affixed to each other so that the electrode surfaces thereof faced each other and the rubbing directions were anti-parallel. The sealing material was then cured by thermo-compression bonding, thereby completing the fabrication of an empty cell. Note that the above described empty cell was fabricated using a multiple mother glass substrate, and one empty cell was obtained via a scribe and break process.

Next, a liquid crystal material with a refractive index anisotropy Δn of approximately 0.18 and a dielectric anisotropy Δ∈<0 was injected into the empty cell using a vacuum injection method. Next, pressing was performed to obtain a more uniform cell thickness, and an ultraviolet curing resin was applied. Subsequently, the cell was maintained with the pressing pressure slightly weakened for approximately several minutes to suction the liquid crystal material from the injection port into the interior, curing was subsequently performed by irradiating ultraviolet rays to seal the port, and the product was baked for one hour at 120° C.

Subsequently, a beveling process of the lead-out electrode terminals or the like was executed, washing was performed, polarizing plates were affixed by a laminator so that a crossed Nicol alignment was substantially formed on the front surface and the rear surface of the cells, and then the air bubbles between the polarizing plate adhesive layer and the glass substrate were removed while heating the product inside a vacuum chamber. Note that the pretilt angle measured using the crystal rotation method prior to affixing the polarizing plates was roughly 89.85°±0.08°.

In the lead-out terminal area, a flexible film was connected to the driver IC input/output terminals via an anisotropic conductive film by a process where a driver IC was thermo-compressed via the anisotropic conductive film, establishing the terminals as terminals that connect to an external controller.

Note that the segment electrode extends in the up-down direction (12 o'clock and 6 o'clock directions) of the liquid crystal display apparatus, and the longitudinal direction of the common electrode extends in the left-right direction (9 o'clock and 3 o'clock directions), and thus the two intersect. Further, the rubbing direction was set to a direction (angle ϕ=10°) that deviated 10° from the 6 o'clock direction for the rear substrate and to a direction (angle ϕ=10° that deviated 10° from the 12 o'clock direction for the front substrate, the orientation direction of the liquid crystal molecules at the center in the layer thickness direction of the liquid crystal layer was set to a direction that deviated 10° from the 6 o'clock direction, and the optimum viewing direction was set to a direction that deviated 10° from the 12 o'clock direction. The electrode structure adopted was the structure shown in FIG. 4 described above, and θ1 was set to ±5°.

Further, in the respective liquid crystal display apparatuses shown as execution examples and a comparison example below, the pixel dimensions are 320 μm long and 320 μm wide, the distance between pixels is 15 μm, the number of segment electrodes is 369, and the number of common electrodes is 120. Further, for the multiplex driving of the respective liquid crystal display apparatuses of the execution examples and comparison example, the multiline selection addressing method (MLS method) indicated in Japanese Patent Laid-Open No. Hei 06-27907 of the patent documents was used, for example. Specifically, the duty was set to 1/120, the bias was set to 1/9, and the number of simultaneous line selections was set to 4. The setup method of the driving voltage VLCD and the frame frequency will be indicated in the following explanation.

Figure 9A:
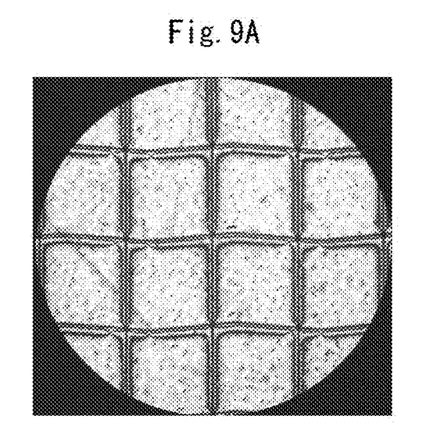
FIG. 9A is a diagram showing the aligned texture during voltage application (during the bright display state) of the liquid crystal display apparatus of an execution example.

FIG. 9A is a diagram showing the aligned texture during the bright display state of the liquid crystal display apparatus of an execution example. The driving voltage VLCD was set to 17.2 V, and the frame frequency was set to 125 Hz. In FIG. 9A, on observing the dark regions of the upper side edge of the respective pixels, it was found that only one intersecting point of the two dark lines existed, and the position was fixed near the bending point. The shapes of the dark lines are also the same. Further, it was confirmed that a decrease in display uniformity caused by poor orientation does not occur even when the liquid crystal display apparatus of this execution example was driven at a frame frequency of 175 Hz in a 80° C. environment.

Figure 9B:
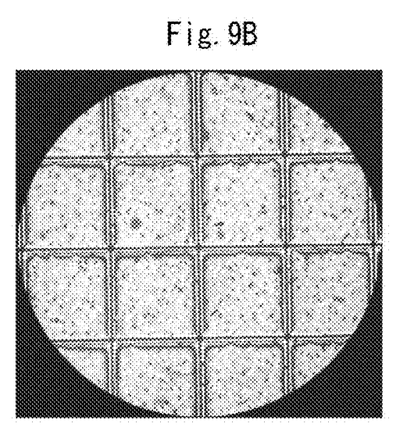
FIG. 9B is a diagram showing the oriented texture during voltage application (during the bright display state) of the liquid crystal display apparatus of a comparison example.

FIG. 9B is a diagram showing the aligned texture during the bright display state of the liquid crystal display apparatus of a comparison example. Note that the comparison example is an example of a liquid crystal display apparatus comprising the same structure as the above described embodiment except that both the first electrode and the second electrode are formed into stripe shapes and are disposed so as to intersect, and the angle ϕ formed by the liquid crystal molecules at the substantial center in the layer thickness direction of the liquid crystal layer and the first direction is set to 0°. As shown in FIG. 9B, dark regions were observed near the three side edges of the pixel and, on observing the dark regions of the upper side edge, two dark lines were observed, and the position where the point in which these dark lines intersect exists was found to differ for each pixel. Such a difference in the number of intersecting points, shape, and the like per pixel is presumably the cause of the occurrence of poor orientation.

Note that this invention is not limited to the subject matter of the foregoing embodiments, and can be implemented by being variously modified within the scope of the gist of the present invention. For example, while the electrode edges of both sides of the second electrode were formed into polygonal line shapes in the embodiments described above, only the electrode edge of one side may be formed into a polygonal line shape. In such a case, the obliquely crossing line segments are preferably disposed on the pixel edge that is on the side where the angle between the orientation direction from the oblique electric field and the orientation direction of the liquid crystal molecules at the substantial center in the layer thickness direction of the liquid crystal layer is greater than 135°.

Figure 10:
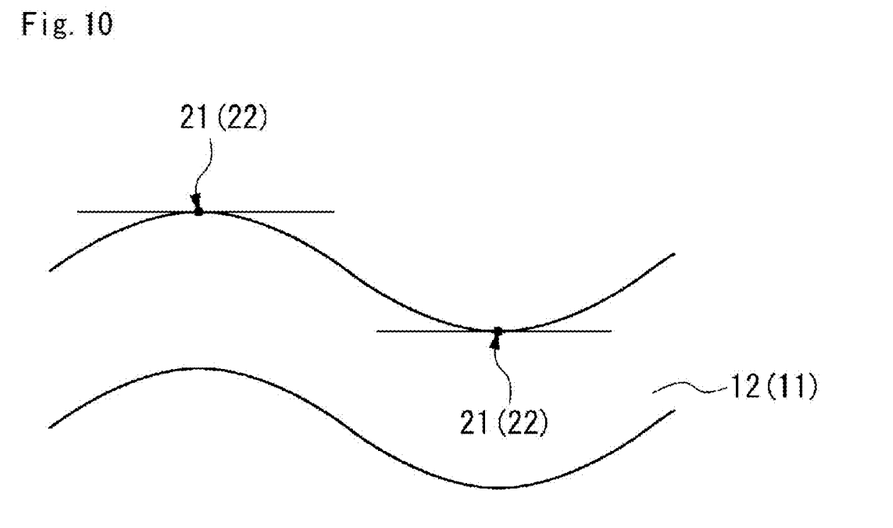
FIG. 10 is a schematic plan view showing a modified configuration of the electrode edges.

Further, while the respective embodiments and execution examples described above indicate cases where the electrode edges of the second electrode (or first electrode) are polygonal line shapes formed by the connection of a plurality of lines, and describe cases where the bending point, which is the intersection point where these lines connect, overlaps with the other electrode, the change point of the electrode edge is not limited to such a bending point. For example, in a case where the electrode edges of the second electrode 12 (or the first electrode 11) are of a shape where a plurality of curves connect as shown in FIG. 10, the point where this curve takes on an extreme value (maximum value or minimum value), that is, the intersection point where a plurality of the curves connect, may be set as the change point 21 (or 22). In such a case, the direction of the line segments that constitute the electrode edges can be defined by the direction that connects the change point that takes on a maximum value and the change point that takes on a minimum value, for example. Furthermore, this curve may be an approximated polygon edge formed by connecting a large number of minute lines.

Figure 11:
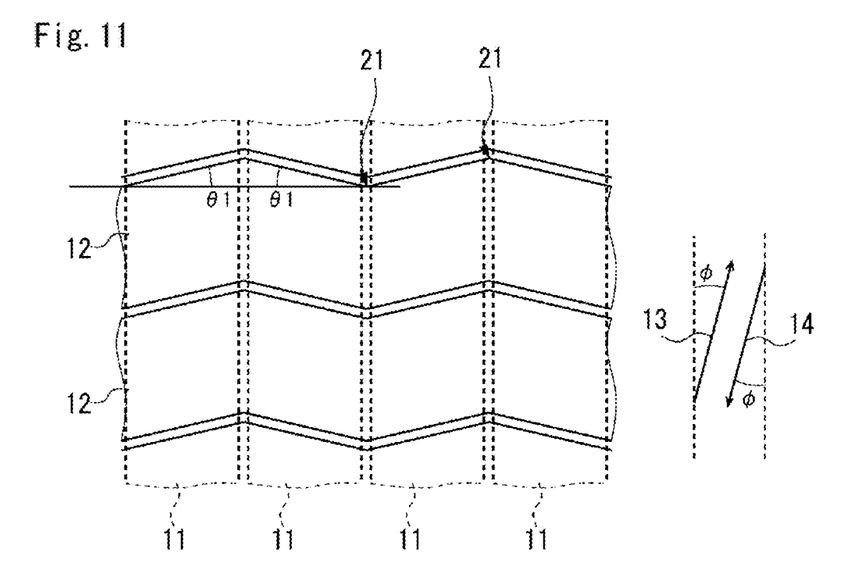
FIG. 11 is a schematic plan view showing another example of the configuration of the electrode edges.

Further, while the respective embodiments and the like have been described above in connection with an illustrative scenario in which the bending points of one electrode overlap with the other electrode, the respective bending points may be disposed between the other electrodes (that is, between pixels). FIG. 11 shows an example of the electrode structure in such a case. The electrode structure shown here is an example in which the position where the first electrodes 11 and the second electrodes 12 overlap in the electrode structure shown in FIG. 2 described above is changed, making the respective bending points 21 of the second electrodes 12 overlap with the gaps between the respective first electrodes 11. Note that, although detailed descriptions are omitted, the respective bending points 21 can be disposed in the same manner in the electrode structure shown in FIGS. 3-8 as well.

Figure 12:
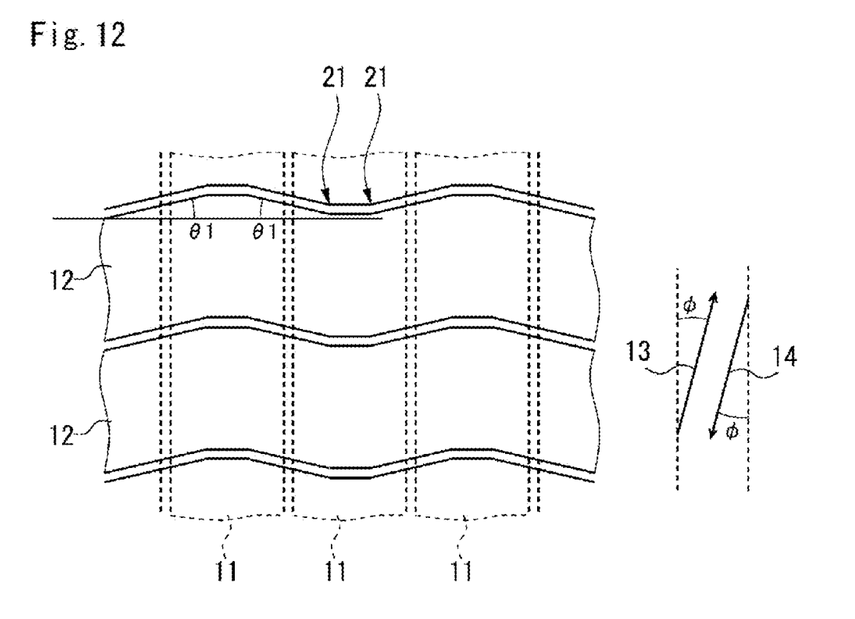
FIG. 12 is a schematic plan view showing another example of the configuration of the electrode edges.

Further, while the respective embodiments and the like have been described above in connection with an illustrative scenario in which the upper side edge and the lower side edge of the respective pixels comprise two sides, respectively, and one bending point serving as the connecting point thereof exists in each pixel, the upper side edge and the lower side edge of the respective pixels may comprise three sides, respectively, and two bending points may exist in each pixel. FIG. 12 shows an example of the electrode structure in such a case. The electrode structure shown here is an example in which one side parallel to the first direction is connected between the two oblique sides of the respective second electrodes 12 in the electrode structure shown in FIG. 2 described above, thereby resulting in the upper side edge and the lower side edge of the respective pixels comprising three sides, respectively, and two bending points existing in each pixel. In such a case, the angles formed by the respective three sides of the upper edge and the lower edge and the orientation direction (the direction parallel to the direction of the orientation process) of the liquid crystal molecules at the substantial center in the layer thickness direction of the liquid crystal layer are the three types of θ±φ and φ. Note that, although detailed descriptions are omitted, the respective bending points 21 can be disposed in the same manner in the electrode structure shown in FIGS. 3-8 as well.

Further, while the respective embodiments and the like have been described above in connection with an illustrative scenario in which the liquid crystal molecules of the liquid crystal layer are uniformly orientated without the directions of the orientation processes executed on the first substrate and the second substrate, respectively, intersecting, the liquid crystal molecules of the liquid crystal layer may be twisted in orientation, intersecting the directions of the orientation processes. In such a case as well, if the direction of the electrode edge is regulated by the relationship with the orientation direction of the liquid crystal molecules in the layer thickness direction of the liquid crystal layer, the same advantages of those of the embodiments and the like described above are achieved.

What is claimed is:

1. A liquid crystal display apparatus, comprising:
a first substrate and a second substrate placed opposite each other,
a plurality of first electrodes which are provided on one surface of the first substrate and which extend in a first direction,
a plurality of second electrodes which are provided on one surface of the second substrate and which extend in a second direction intersecting the first direction; and
a mono-domain vertical alignment type liquid crystal layer with a pretilt angle of less than 90°, provided between said one surface of the first substrate and said one surface of the second substrate,
wherein a plurality of pixels are defined in respective regions where the first electrodes and the second electrodes intersect each other,
wherein in a planer view, an electrode edge of at least one side of each of the second electrodes is of a shape that includes line segments that are periodically and obliquely crossed relative to the second direction and bend back,
wherein pixel edges of the pixels are demarcated by edges of the first electrodes and the second electrodes, including the line segments that are obliquely crossed
wherein all bending points formed by the line segments that are periodically and obliquely crossed relative to the second direction and bend back overlap within edges demarcated by the edges of the first electrodes of respective corresponding pixels,
wherein all bending points where directions of the line segments of the electrode edges of the second electrodes change are disposed overlapping in the planar view with corresponding ones of the first electrodes,
wherein in the planer view, the liquid crystal layer is disposed so that an angle of an alignment direction of liquid crystal molecules at a substantial center in a layer thickness direction and a direction perpendicular to the second direction is set to be greater than 0° and equal to or less than 15°, and
wherein the alignment direction of the liquid crystal molecules and the directions of the line segments that are obliquely crossed do not become perpendicular.

2. The liquid crystal display apparatus according to claim 1, wherein the angle in the planer view of the alignment direction of the liquid crystal molecules at the substantial center in the layer thickness direction and the direction perpendicular to the second direction is defined as φ, and
wherein, with respect to a given one of the pixels:
an angle formed by the electrode edge of the second electrode and the second direction is defined as θ1,
an angle formed by a left-side pixel edge defined by the line segments that are obliquely crossed in the second electrode and the alignment direction of the liquid crystal molecules at the substantial center in the layer thickness direction of the liquid crystal layer is θ1+φ, and an angle formed by a right-side pixel edge defined by the line segments that are obliquely crossed in the second electrode and the alignment direction of the liquid crystal molecules at the substantial center in the layer thickness direction of the liquid crystal layer is θ1−φ, and
respective absolute values of θ1+φ and θ1−φ are greater than 0°.

3. The liquid crystal display apparatus according to claim 2, wherein each bending point is disposed at a center between electrode edges of both sides of a corresponding one of the first electrodes, and
wherein respective absolute values of θ1+φ and θ1−φ are equal to or greater than 5°.

4. The liquid crystal display apparatus according to claim 2, wherein each bending point is disposed so that it is biased toward a side near the edge of either side of a corresponding one of the first electrodes.

5. The liquid crystal display apparatus according to claim 1, wherein the line segments that are obliquely crossed are disposed at an angle greater than 0° and less than or equal to 15° using the second direction as standard.

6. The liquid crystal display apparatus according to claim 2, wherein the line segments that are obliquely crossed are disposed at an angle greater than 0° and less than or equal to 15° using the second direction as standard.

7. The liquid crystal display apparatus according to claim 3, wherein the line segments that are obliquely crossed are disposed at an angle greater than 0° and less than or equal to 15° using the second direction as standard.

8. The liquid crystal display apparatus according to claim 4, wherein the line segments that are obliquely crossed are disposed at an angle greater than 0° and less than or equal to 15° using the second direction as standard.

9. A liquid crystal display apparatus, comprising:
a first substrate and a second substrate placed opposite each other,
a plurality of first electrodes which are provided on one surface of the first substrate and which extend in a first direction,
a plurality of second electrodes which are provided on one surface of the second substrate and which extend in a second direction intersecting the first direction; and
a mono-domain vertical alignment type liquid crystal layer with a pretilt angle of less than 90°, provided between said one surface of the first substrate and said one surface of the second substrate,
wherein a plurality of pixels are defined in respective regions where the first electrodes and the second electrodes intersect each other,
wherein in a planer view, an electrode edge of at least one side of each of the second electrodes is of a shape that includes line segments that are periodically and obliquely crossed relative to the second direction and bend back,
wherein all bending points formed by the line segments that are periodically and obliquely crossed relative to the second direction and bend back constitute edges of the pixels,
wherein all bending points where directions of the line segments of the electrode edges of the second electrodes change are disposed overlapping in the planar view with corresponding ones of the first electrodes,
wherein pixel edges of the pixel are demarcated, including the line segments that are obliquely crossed, and
wherein in the planer view, the liquid crystal layer is disposed so that an angle of an alignment direction of liquid crystal molecules at a substantial center in a layer thickness direction and a direction perpendicular to the second direction is set to be greater than 0° and equal to or less than 15°, and
wherein the alignment direction of the liquid crystal molecules and the directions of the line segments that are obliquely crossed do not become perpendicular.

10. The liquid crystal display apparatus according to claim 9, wherein the angle in the planer view of the alignment direction of the liquid crystal molecules at the substantial center in the layer thickness direction and the direction perpendicular to the second direction is defined as $\phi$, and
wherein, with respect to a given one of the pixels:
an angle formed by the electrode edge of the second electrode and the second direction is defined as $\theta 1$,
an angle formed by a left-side pixel edge defined by the line segments that are obliquely crossed in the second electrode and the alignment direction of the liquid crystal molecules at the substantial center in the layer thickness direction of the liquid crystal layer is $\theta 1+\phi$, and an angle formed by a right-side pixel edge defined by the line segments that are obliquely crossed in the second electrode and the alignment direction of the liquid crystal molecules at the substantial center in the layer thickness direction of the liquid crystal layer is $\theta 1-\phi$, and
respective absolute values of $\theta 1+\phi$ and $\theta 1-\phi$ are greater than 0°.

11. The liquid crystal display apparatus according to claim 10, wherein each bending point is disposed at a center between electrode edges of both sides of a corresponding one of the first electrodes, and
wherein respective absolute values of $\theta 1+\phi$ and $\theta 1-\phi$ are equal to or greater than 5°.

12. The liquid crystal display apparatus according to claim 10, wherein each bending point is disposed so that it is biased toward a side near an electrode edge of either side a corresponding one of the first electrodes.

13. The liquid crystal display apparatus according to claim 9, wherein the line segments that are obliquely crossed are disposed at an angle greater than 0° and less than or equal to 15° using the second direction as standard.

14. The liquid crystal display apparatus according to claim 10, wherein the line segments that are obliquely crossed are disposed at an angle greater than 0° and less than or equal to 15° using the second direction as standard.

15. The liquid crystal display apparatus according to claim 11, wherein the line segments that are obliquely crossed are disposed at an angle greater than 0° and less than or equal to 15° using the second direction as standard.

16. The liquid crystal display apparatus according to claim 12, wherein the line segments that are obliquely crossed are disposed at an angle greater than 0° and less than or equal to 15° using the second direction as standard.

* * * * *